(12) United States Patent
Moore

(10) Patent No.: US 8,069,180 B1
(45) Date of Patent: *Nov. 29, 2011

(54) SYSTEMS AND METHODS FOR AUTOMATED EMPLOYEE RESOURCE DELIVERY

(75) Inventor: Joy Elaine Moore, Devine, TX (US)

(73) Assignee: United Services Automobile Association, San Antonio, TX (US)

(*) Notice: Subject to any disclaimer, the term of this patent is extended or adjusted under 35 U.S.C. 154(b) by 181 days.

This patent is subject to a terminal disclaimer.

(21) Appl. No.: 11/512,980

(22) Filed: Aug. 29, 2006

(51) Int. Cl.
*G06F 7/00* (2006.01)
(52) U.S. Cl. .................... 707/759; 707/771
(58) Field of Classification Search ........... 707/3, 759, 707/771; 726/6
See application file for complete search history.

(56) References Cited

U.S. PATENT DOCUMENTS

| | | | |
|---|---|---|---|
| 6,049,776 A | 4/2000 | Donnelly et al. | |
| 6,161,139 A | 12/2000 | Win et al. | |
| 6,253,202 B1 | 6/2001 | Gilmour | |
| 2002/0184535 A1 | 12/2002 | Moaven et al. | |
| 2003/0135495 A1* | 7/2003 | Vagnozzi | 707/3 |
| 2003/0225638 A1* | 12/2003 | Secola | 705/30 |
| 2004/0162905 A1 | 8/2004 | Griffin et al. | |
| 2005/0022198 A1 | 1/2005 | Olapurath et al. | |
| 2007/0204333 A1* | 8/2007 | Lear et al. | 726/6 |

OTHER PUBLICATIONS

AtTask Inc., AtTask Project Management Software, "Press Releases: AtTask's New Project Management Software Scales for the Enterprise," http://www.attask.com/news-releases/2006-05-24_attask-project-management-software-scales-for-enterprise/, May 24, 2006, downloaded Aug. 1, 2006, 2 pages.
Greenberg, J., "Employee Theft as a Reaction to Underpayment Inequity: The Hidden Cost of Pay Cuts," *Journal of Applied Psychology*, 1990, 75(5), 561-568.
"New, moving and departing staff: Notes for Managers," revised Jul. 22, 2005, downloaded Jun. 12, 2006.
Replicon, Inc., Replicon—Web Resource, "Simple Scheduling of Employees to Projects," http://www.repliconwr.com/lp/lp_resourcetracking.asp, downloaded Aug. 1, 2006, 2 pages.
Varis Mine Technology Ltd., Varis—Smart Underground Communications, "Smart Tag Software," http://www.varismine.com/products/smarttag/smarttag_software.php, downloaded Aug. 1, 2006, 4 pages.
Gilbert, Introduction to TCP/IP, Feb. 2, 1995, 6 pgs.

* cited by examiner

*Primary Examiner* — Shahid Alam
*Assistant Examiner* — Donald Lawson
(74) *Attorney, Agent, or Firm* — Brooks, Cameron & Huebsch PLLC

(57) ABSTRACT

Systems and methods are provided for automated employee resource delivery in a variety of situations that may commonly arise in modern large company settings. Employee identification data may be identified, and a subset of such data that is required for release of a particular resource may be identified. An automatic notification may be generated for the resource owner, where the automatic notification comprises the required subset of employee identification data. This approach is combined with one or more techniques for ascertaining the resources an employee will require and updating information regarding the resources employees are using.

15 Claims, 9 Drawing Sheets

Role 405 Resource List

| | Resource Description | Resource Owner | Electronic Communications Address | Required Employee Identification Data |
|---|---|---|---|---|
| Entry 405a | Telephone | Jane Doe | JaneD@company.com | Name, Social Security Number, Employee ID, Email address, workstation location |
| Entry 405b | Basic Computer | IT Department | Tech@company.com | [link to data] |
| Entry 405c | ... | ... | ... | ... |

Employee 509 Resource List

| | Resource Description | Resource Owner | Electronic Communications Address | Required Employee Identification Data |
|---|---|---|---|---|
| Entry 509a | Telephone | Jane Doe | JaneD@company.com | Name, Social Security Number, Employee ID, Email address, workstation location |
| Entry 509b | Basic Computer | IT Department | Tech@company.com | [link to data] |
| Entry 509c | ... | ... | ... | ... |

Manager 605 Resource List

|  | Resource Description | Resource Owner | Electronic Communications Address | Required Employee Identification Data |
|---|---|---|---|---|
| Entry 605a | Telephone | Jane Doe | JaneD@company.com | Name, Social Security Number, Employee ID, Email address, workstation location |
| Entry 605b | Basic Computer | IT Department | Tech@company.com | [link to data] |
| Entry 605c | ... | ... | ... | ... |

Workstation 708 Resource List

| | Resource Description | Resource Owner | Electronic Communications Address | Required Employee Identification Data |
|---|---|---|---|---|
| Entry 708a | Telephone | Jane Doe | JaneD@company.com | Name, Social Security Number, Employee ID, Email address, workstation location |
| Entry 709b | Basic Computer | IT Department | Tech@company.com | [link to data] |
| Entry 710c | ... | ... | ... | ... |

SYSTEMS AND METHODS FOR AUTOMATED EMPLOYEE RESOURCE DELIVERY

CROSS-REFERENCE TO RELATED APPLICATIONS

This application is related to U.S. patent application Ser. No. 11/512,979 and U.S. patent application Ser. No. 11/512,808, both filed on Aug. 29, 2006, and also entitled "Systems and Methods for Automated Employee Resource Delivery."

BACKGROUND

Most companies provide resources to employees to maximize their productive potential. For example, in a modern office environment, an employee may be provided with a workstation and a computer that is equipped with a variety of hardware and software. The employee may also have network access to additional hardware and software. The employee may be provided with access permissions as necessary to utilize resources such as email accounts, fax machines, printers, and network drive space. The employee may be further equipped with resources such as a telephone, building access badge, keys, cell phones, and so forth.

Although a variety of software products are available for assigning and scheduling "human resources," i.e. employee time and expertise that is needed to accomplish a complex project, such products neglect the tools employees may need to extend their productivity. Instead, such products simply assume that a company has provided its employees with the tools they need to be as effective as possible.

Meanwhile, the resources provided to employees are typically controlled by a diverse set of resource owners. For example, a workstation building access badge may be owned by a building maintenance department, while a computer is owned by an Information Technology (IT) department. A telephone may be owned by a human resources department, while access permissions to various computing resources may be owned by the business units that maintain and manage such resources. It may fall on a new employee, the employee's manager, or a person with appropriate knowledge of company practices to equip employees with the resources they need.

In a large company, resource owners become spread out and develop their own unique protocols for accepting and reviewing resource requests. Some require an approval from a manager or other person of appropriate authority. Some require information from the requesting employee, such as the employee's employee ID number, username and password, social security number, and so forth. Satisfying the demands of the various resource owners in order to acquire all the resources an employee needs becomes a difficult and time consuming task that presents an efficiency drag on the business.

In light of the above mentioned difficulties, systems and methods are needed for fast identification of the resources employees should have, and for providing resources from a disparate group of resource owners. This would increase efficiency as employees enter, leave, and transform within a company.

SUMMARY

In consideration of the above-identified shortcomings of the art, the present disclosure provides systems and methods for automated employee resource delivery in a variety of situations that may commonly arise in modern large company settings, for example when a new employee joins a workforce, when an employee request a new resource, and when an employee changes functions such as by promotion or lateral transfer within a company. In general, employee identification data may be identified, and a subset of such data that is required for release of a particular resource may be identified. An automatic notification may be generated for the resource owner, where the automatic notification comprises the required subset of employee identification data. This approach is combined with one or more techniques for ascertaining the resources an employee will require and updating information regarding the resources employees are using, as described in greater detail below.

BRIEF DESCRIPTION OF THE DRAWINGS

The systems and methods for automated employee resource delivery in accordance with the present disclosure are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In general, the below description begins with exemplary methods that may be implemented in accordance with embodiments of the invention. Thereafter, computer hardware, software, and networking components are described that may be used to implement such methods, or to provide system and computer readable media embodiments the invention.

Figure 1:
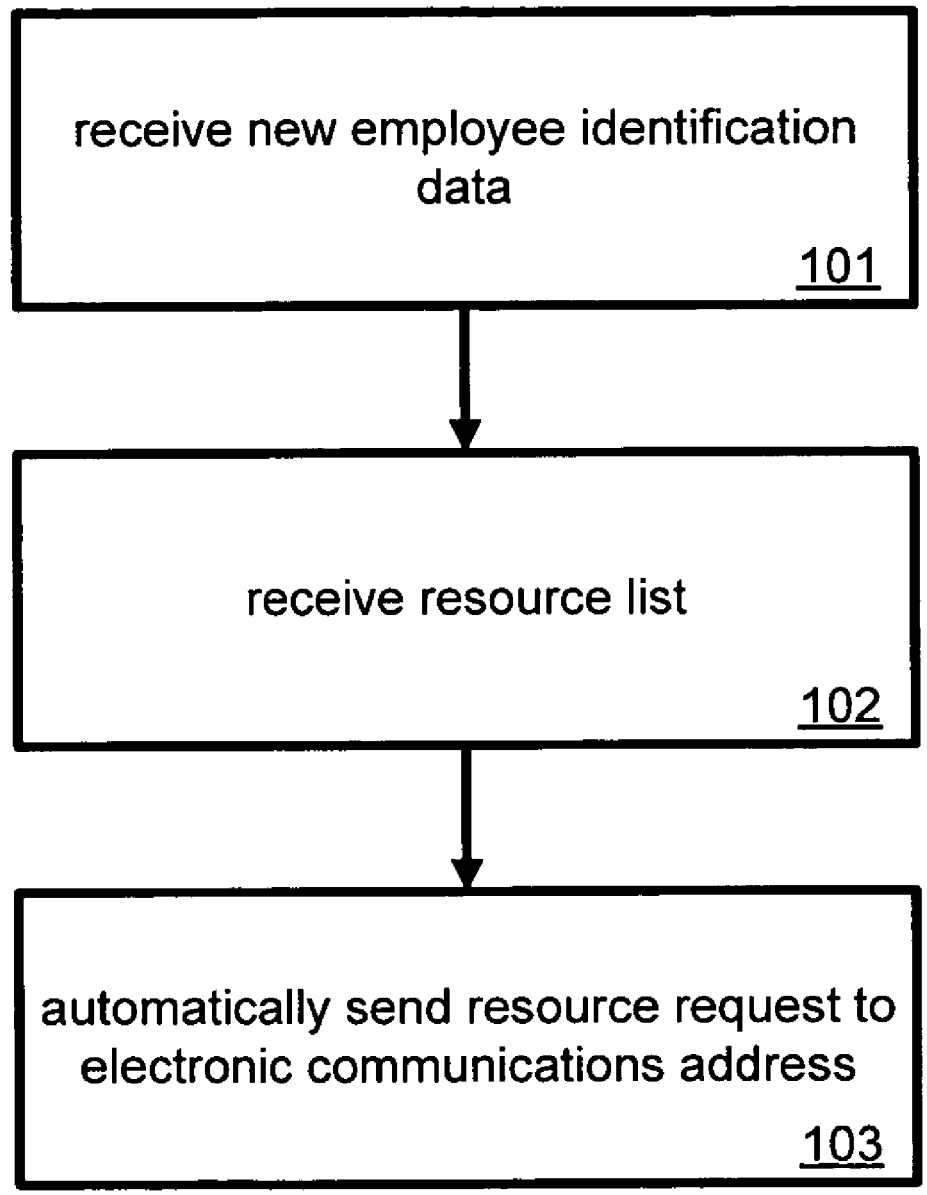
FIG. 1 illustrates an exemplary method for assigning resources to a new employee.

FIG. 1 illustrates an exemplary method for delivering resources to a new employee. An exemplary method for employee resource delivery according to FIG. 1 may comprise receiving new employee identification data 101. Employee identification data may comprise data such as employee name, employee social security number, employee address, employee identification number, employee username, employee password, employee building access number, employee criminal history, employee insurance policy data, employee credit card number, employee bank account information, employee email, and the like. Modern companies collect a host of identification data from their employees for a large variety of identification, tax, financial, reimbursement and other reasons, and any such data may be included in the employee identification data. Because resource owners typically require a wide variety of different information, it is preferable to include a similarly wide variety of employee identification data in step 101.

The act of receiving the new employee identification data according to step 101 may be accomplished, in one embodiment, by a computer. For example, a company employee in a human resource department may collect the data from a new employee, and subsequently enter such data into a terminal. The terminal in such an embodiment receives the new employee identification data, as may a central company database that is updated from the terminal.

The method of FIG. 1 may further comprise receiving a resource list 102. A resource list is a list of resources that the employee will need to perform his or her function in the company. A huge variety of resources are utilized by modern employees depending on the work they do and the resources available to their employer. In an office environment, as mentioned above, common resources include a workstation location, a computer equipped with a variety of hardware and software as necessary, network access to additional hardware and software, access permissions as necessary to utilize resources such as email accounts, fax machines, printers, and network drive space, a telephone, a building access badge, keys, cell phones, and so forth. In a construction environment an employee may receive tool belt, tape measure, hammer, drill, hard hat, safety goggles, work gloves, specialized clothing, and the like. The resources that are necessary in a particular setting cannot be exhaustively described herein and such considerations are left to the particular needs of an implementing organization.

Different employees serve different functions, and will accordingly need different resources. Thus, a resource list is not an exhaustive list of all resources any employee may need, but rather a list that is tailored to the particular needs of the employee in question. Embodiments may provide a variety of approaches for selecting an appropriate resource list, and for keeping resource lists that remain up-to-date for continued use within a company as new employees join, leave, and transform within the company. FIGS. 4-7 provide a variety of exemplary approaches for organizing resource lists and for assigning resource lists to employees in a disciplined fashion. See below for a detailed description of these figures.

An appropriately configured resource list according to this disclosure comprises entries with at least four fields: a resource description, a resource owner, an electronic communications address for requesting the resource, and a specification of a subset of employee identification data that is required for release of the resource. Additional fields may be included as desired to meet additional needs and requirements in particular settings.

The act of receiving a resource list according to step 102 may be accomplished, in one embodiment, by a computer. For example, a company employee in a human resource department may select an appropriate resource list for a new employee, for example by selecting a resource list from a collection of different resource lists. The act of selecting an appropriate resource list causes the computer in question, to receive the resource list, or at least an identification of the resource list, which also satisfies step 102. A central company database may also receive the resource list or an identification thereof when such database is updated from an individual terminal.

The method of FIG. 1 may further comprise automatically sending a resource request to the electronic communications address 103 that is provided in a corresponding entry in the resource list. For example, a computer that received employee identification data and also a resource list may perform this step. Such computer may use an appropriate algorithm to walk through the entries in a received resource list, and request each resource for the new employee.

An exemplary algorithm for doing so may include, for example, appropriate logic and subsystems to identify an entry in the resource list, identify the specification of a subset of employee identification data that is required for release of the resource, identify the electronic communications address for requesting the resource, extract the subject employee's identification data from the employee identification data, and generate an electronic notification directed to such electronic communications address, where in one embodiment the notification includes only the employee identification data that is required for release of the resource. The algorithm may also execute the sending of the notification.

The electronic notification may be, in one embodiment, an email. In this case the electronic communications address would preferably be an email address or email alias. It need not, however, be the email address of the resource owner. In many situations, the resource owner may delegate satisfaction of resource requests to another, while the owner may remain behind the scenes for approval of the request and management of the resource. In additional embodiments, the electronic notification may be a post to a resource owner's web page, a call to an Application Programming Interface (API) provided by the resource owner, a file that is saved to a location accessible by the resource owner, and the like.

FIG. 1 and the various other Figures herein may be extended as necessary to accommodate departing employees, for example employees who are terminated, relocated, or otherwise leave a company or a particular company location. In such embodiments, the various steps of, for example, FIG. 1 may be supplemented by systems and methods for receiving an employee departure notification that identifies a departing employee, automatically locating departing employee identification data associated with said departing employee, automatically identifying a resource list associated with said departing employee, and automatically sending a resource recovery request to an electronic communications address on said resource list associated with a departing employee, said resource recovery request comprising said departing employee identification data. Here, the resource recovery request may serve to put resource owners on notice that they are responsible for recovering their resource. The departing employee identification data may thus advantageously include employee workstation location, and even employee home address in situations where an employee is furnished with portable resources or resources such as those for teleworking out of the home. A flag may be included with the departing employee identification data if the employee departed on hostile terms or expedited resource recovery is otherwise recommended. Removal or displacement of equipment, hardware/software, company cell phones, RLA/VPN accounts, keys, card accesses, system accesses and so forth can thus be accomplished much more rapidly than under existing practices.

Figure 2:
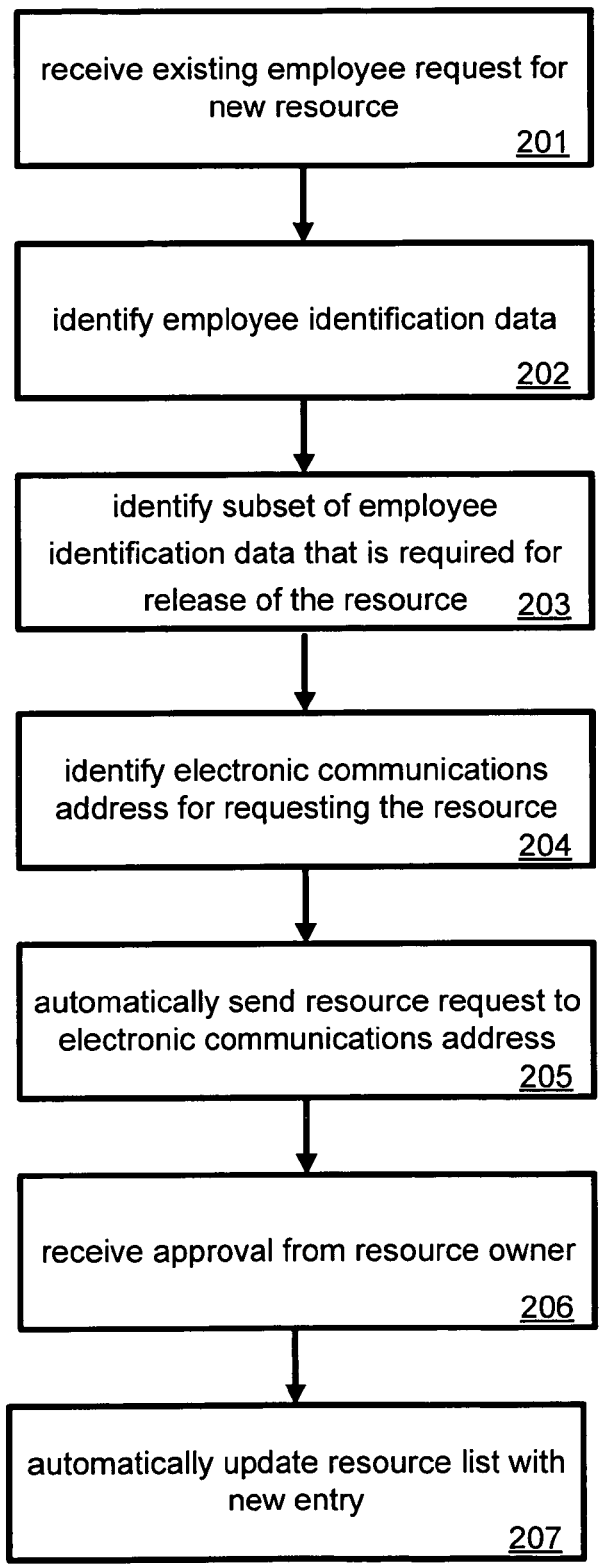
FIG. 2 illustrates an exemplary method for assigning resources to an existing employee.

FIG. 2 illustrates an exemplary method for assigning resources to an existing employee. Various of the steps in FIG. 2 can be understood from the above description of FIG. 1. In general, FIG. 2 illustrates a method for employee resource delivery in a scenario involving updating the resources that are allocated to existing employees in such a way as to keep track of the resources that are required by a company's various employees. A first step in the method of FIG. 2 may comprise receiving an existing employee request for a new resource 201. Here, it is generally contemplated that one employee or department will perform the function of a centralized resource clearinghouse, and the request for a new resource will be received at such a central location. For example, a request may be received in the form of an email to an employee in a human resources department, where the employee is responsible for tracking resource requests and keeping appropriately updated resource lists. However, embodiments may also be envisioned in which requests are received by resource owners directly, and the resource owners update resource lists in a distributed fashion, for example by individually accessing resource lists residing in a central database.

A next step in FIG. 2 may comprise identifying employee identification data associated with said existing employee 202. This is similar to step 101 in FIG. 1, except that the employee identification data presumably already exists in the company's data stores and so need only be identified or retrieved. The employee identification data may be identified, for example, by an automated process that receives the existing employee request, or by a human operator that reads the existing employee request after it is received.

A next step in FIG. 2 may comprise identifying a specification of a subset of employee identification data that is required for release of the resource 203. Here, the resource may be associated with one or more existing resource lists, in which case the specification of a subset of employee identification data may be usefully pulled from an existing resource list. In another embodiment, the specification of a subset of employee identification data may be recovered from the resource owner. For example, resource owners may publish on a company intranet a specification of a subset of employee identification data that is required for requesting their resource. In this case, an automated process that may have identified employee identification data may also retrieve the specification of a subset of employee identification data from the published location. Resource owners may also save their specifications of a subset of employee identification data to a centrally accessible file, or such information may be otherwise kept within a centralized information clearinghouse.

Step 204 comprises identifying an electronic communications address for requesting the resource, and may optionally be performed according to the same approaches available for step 203. In short, the electronic communications address may be pulled from an existing resource list, or may be recovered from information that is published by the resource owner.

The method of FIG. 2 may further comprise automatically sending a resource request to the electronic communications address 205 that is identified in step 204. Similar to step 103 in FIG. 1, a computer that has identified employee identification data, the required subset of employee information to request the resource, and the appropriate electronic communications address, may perform this step. Such computer may use an appropriate algorithm to request the requested resource for the existing employee.

Having requested the resource, it may remain unknown in this scenario whether approval will be granted by the resource owner. If approval is granted, an appropriate corresponding resource list must be updated so that the resource lists remain useful in determining appropriate resources for other employees. Thus, step 206 comprises receiving an approval from a resource owner. In fully automated embodiments, an automated process that sent the resource request pursuant to step 205 may also receive an appropriately formatted approval in step 206. The approval can operate as implicit agreement to also deliver the requested resource to the existing employee, as well as any other existing employees who may also be deemed to be entitled to the resource in view of the newly granted approval.

Figure 4:
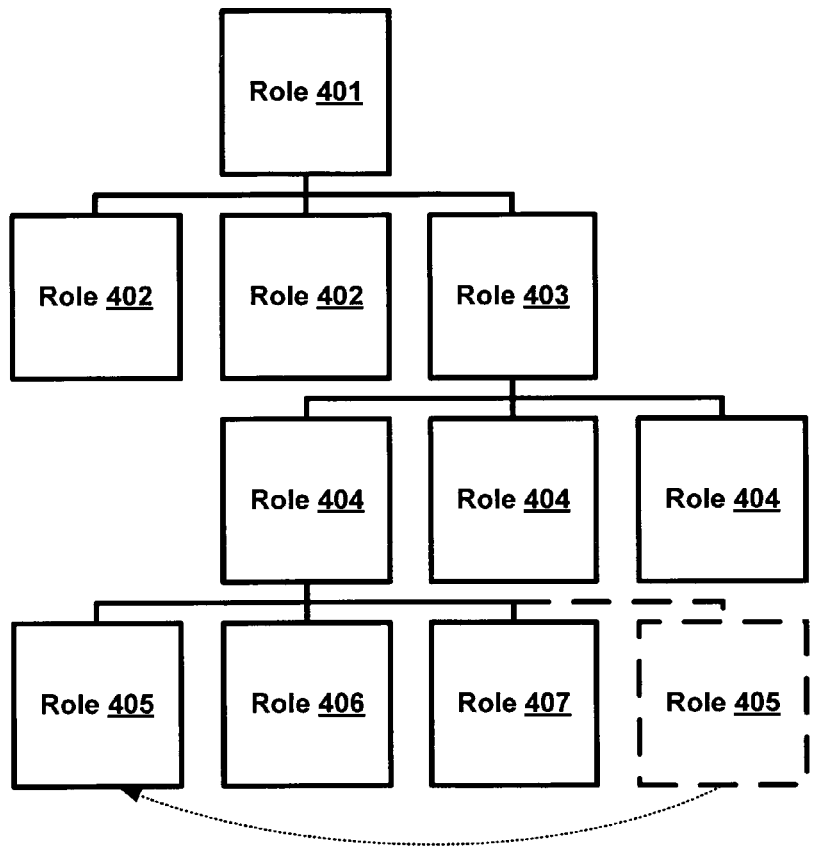
FIG. 4 illustrates an approach for associating resource lists with employee roles and for providing a plurality of selectable roles that may be used to determine appropriate employee resources.
Figure 5:
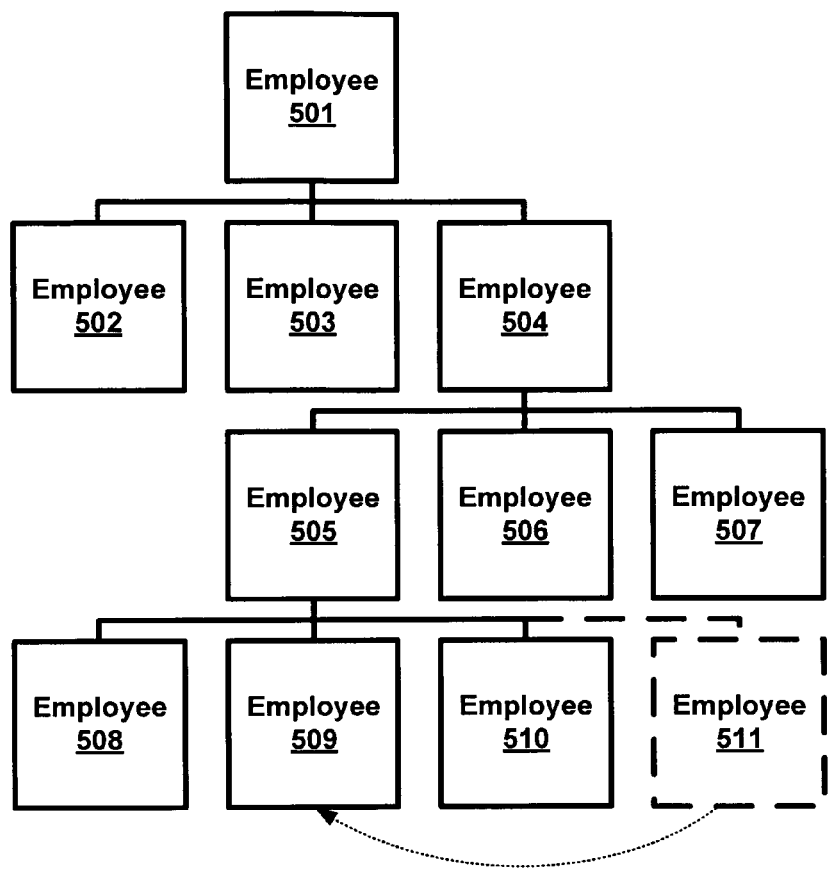
FIG. 5 illustrates an approach for associating resource lists with employees and for providing a plurality of selectable employees that may be used to determine appropriate employee resources.
Figure 6:
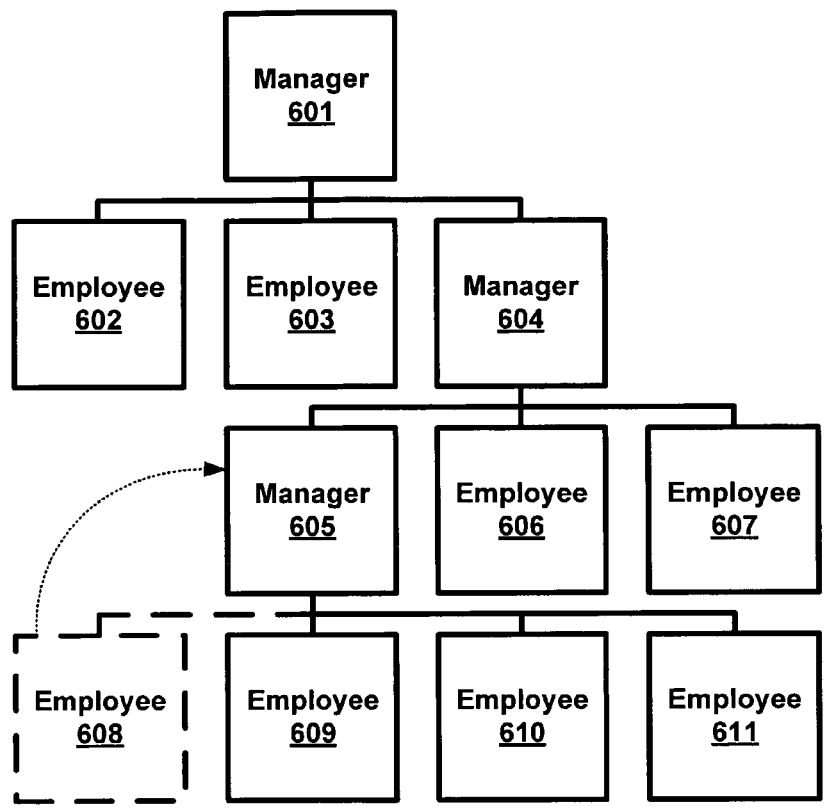
FIG. 6 illustrates an approach for associating resource lists with managers and for providing a plurality of selectable managers that may be used to determine appropriate employee resources.
Figure 7:
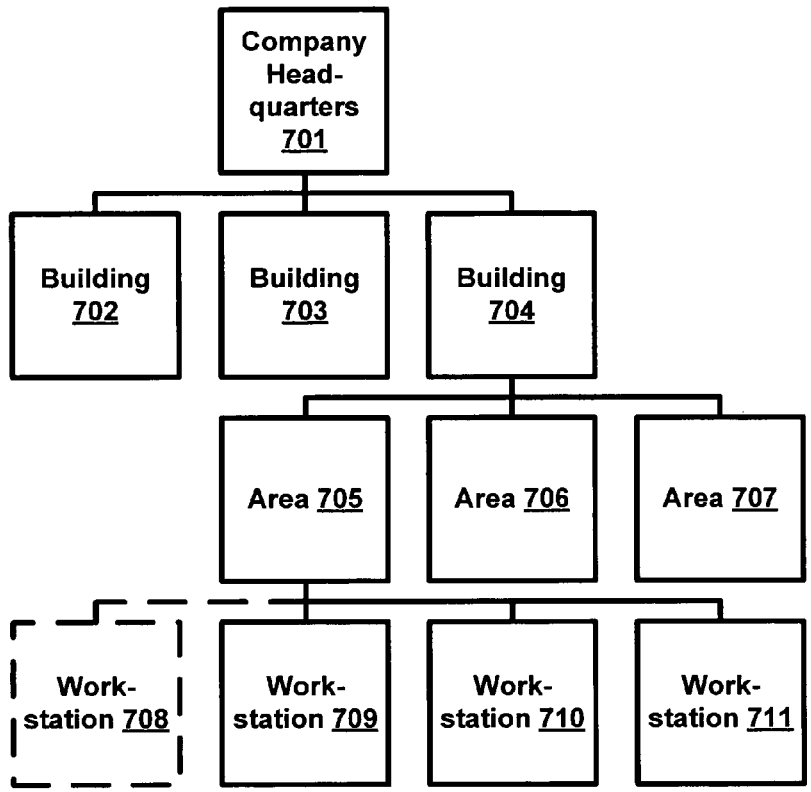
FIG. 7 illustrates an approach for associating resource lists with workstation locations and for providing a plurality of selectable workstation locations that may be used to determine appropriate employee resources.

A resource list may be automatically updated with a new entry for the newly approved resource 207. The resource list that is updated depends on how the resource lists are configured, e.g. in an embodiment such as illustrated in FIG. 4, described further below, an employee role resource list may be updated. In an embodiment such as illustrated in FIG. 5, described further below, an employee resource list may be updated. In an embodiment such as illustrated in FIG. 6, described further below, a manager resource list may be updated. In an embodiment such as illustrated in FIG. 7, described further below, a workstation location resource list may be updated.

An exemplary algorithm for updating a resource list according to step 207 may comprise, for example, appropriate logic and subsystems to identify a resource list that is associated with the requesting employee, and to update that resource list with a new entry comprising the resource description, resource owner, electronic communications address for requesting the resource, and specification of a subset of employee identification data that is required for release of the resource.

Figure 3:
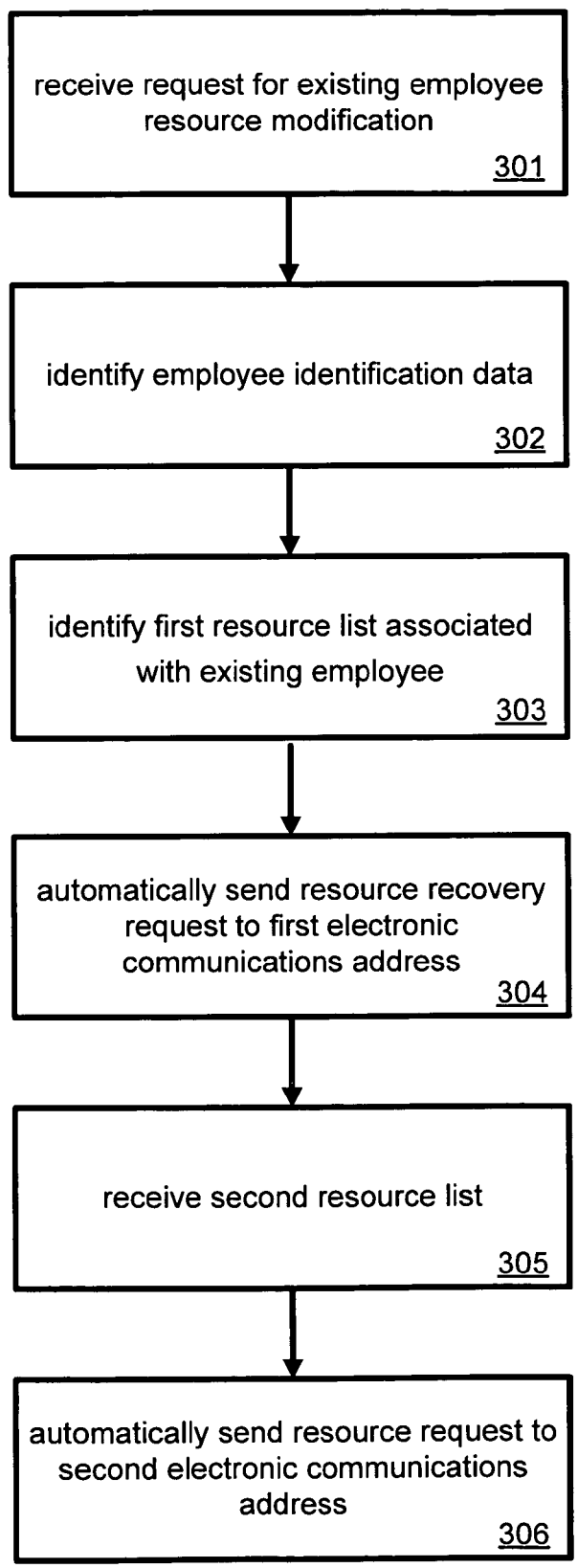
FIG. 3 illustrates an exemplary method for assigning resources to an employee that changes function.

FIG. 3 illustrates an exemplary method for assigning resources to an employee that changes function, for example by virtue of a promotion or a lateral transfer within a company. In such a situation, the subject employee may no longer need their former resources, and may instead need a new set of resources. It may also be likely that the subject employee will need some of their former resources but not others, and will need some new resources. For example, if an employee is promoted, the employee may require new access permissions to data that was formerly inaccessible. Access permissions are considered a resource for the purpose of this disclosure.

The exemplary method of FIG. 3 may first comprise receiving a request for existing employee resource modification 301. Such a request may be sent by the employee themselves, or by the department or new manager to which the employee has transferred. The request may be received by a computer, for example a computer that is operated by a human resources department or employee who is otherwise responsible for centralized resource tracking.

This request may comprise information that identifies the new position of the employee in a variety of ways. In one embodiment, the request may identify a new employee role. In another embodiment, the request may identify another existing employee who performs a function that is most closely similar to the function that the transferred employee will provide. In another embodiment, the request may identify a new manager of the transferred employee. In another embodiment, the request may identify a new workstation location for the transferred employee. The request may, but need not identify, the former role of the subject employee, because presumably the former role is data that is known and may be easily accessed.

Step 302 comprises identifying employee identification data and may be performed in an identical fashion as step 202 from FIG. 2.

Step 303 comprises identifying a first resource list associated with the existing employee. This first resource list is the list of resources to which the employee was entitled in his or her previous position. The resource list comprises entries comprising resource descriptions, resource owners, electronic communications addresses, and specifications of subset of employee identification data, as described above. In one embodiment the first resource list may be identified by determining a resource list associated with a previous employee role associated with the employee. In another embodiment the resource list may be identified by determining a resource list that is directly associated with the employee. In another embodiment the first resource list may be identified by determining a resource list associated with a previous manager associated with the employee. In another embodiment the first resource list may be identified by determining a resource list associated with a previous workstation associated with the employee.

Step 304 comprises automatically sending a resource recovery request to a first electronic communications address, i.e., to an electronic communications address listed on said first resource list. Resource recovery requests may be sent to each of the electronic communications addresses on the first resource list, so that the resource owners may recall their resources from the transferred employee.

The issue of overlapping resources, i.e., resources that the transferred employee needed in their previous position, and will also need in their new position, can be dealt with in a variety of ways. In one embodiment, a computer may compare the first resource list with a second resource list, and send resource recovery requests to only those electronic communications addresses associated with resources that the employee will no longer need. Similarly, resource requests may be sent to only those electronic communications addresses associated with resources that the employee will need in their new position.

In another embodiment, resource recovery requests may be sent to all electronic communications address on a first resource list, and resource requests may be sent to all electronic communications addresses on a second resource list. The owners of the resources can determine on their own whether to recall a previous resource and send a new one, or to simply allow the employee to keep the previous resource.

An appropriately configured algorithm can send resource recovery requests in either of the embodiments above by identifying the electronic communications addresses in the first resource list, and sending a recovery request to such electronic communications addresses.

Step 305 comprises receiving a second resource list. As with step 102 in FIG. 1, this may comprise selecting an appropriate resource list for the transferred employee, for example by selecting a resource list from a collection of different resource lists. A drop-down listing of available resource lists may be presented for easy selection within a user interface. The act of selecting an appropriate resource list causes the computer in question to receive the resource list, or at least an identification of the resource list, which also satisfies step 305. A central company database may also receive the resource list or an identification thereof when such database is updated from an individual terminal.

The exemplary method of FIG. 3 may finally comprise automatically sending a resource request to a second electronic communications address, i.e., an electronic communications address on the new (second) resource list associated with the transferred employee. Here, resource requests are sent to the various electronic communications addresses associated with the resources to which the transferred employee is newly entitled.

As with step 103 in FIG. 1, a computer that received employee identification data and also the second resource list may perform this step. Such computer may use an appropriate algorithm to walk through the entries in the second resource list, and request each resource for the transferred employee.

An exemplary algorithm for doing so may include, for example, appropriate logic and subsystems to identify an entry in the resource list, identify the specification of a subset of employee identification data that is required for release of the resource, identify the electronic communications address for requesting the resource, extract the subject employee's identification data from the employee identification data, and generate an electronic notification directed to such electronic communications address, where in one embodiment the notification includes only the employee identification data that is required for release of the resource. The algorithm may also execute the sending of the notification.

FIG. 4 illustrates an approach for associating resource lists with employee roles and for providing a plurality of selectable roles that may be used to determine appropriate employee resources. In FIG. 4, a resource list may be associated with each of the employee roles 401-407 depicted in the organizational chart. While it is likely that employees at a same grouping level in the organizational chart will have a similar role, it is also possible that such employees will have different roles. For example a CEO may have role 401, while two vice presidents have role 402 and one vice president has role 403. In this example, all three general managers under vice president with role 403 have role 404, and the employees under one of the general managers have roles 405, 406, and 407. Thus, while there are numerous employees at various levels, the employees are assigned roles as necessary for their resource needs.

All roles 401-407 can be compiled into a digitized drop-down list of selectable roles that is accessible, for example, to a human resource department when a new employee is hired. For example, consider a scenario in which a new employee is hired as represented by the dotted box in FIG. 4. It may be determined that the new employee will have role 405. A resource list may be associated with role 405, such that upon determining the appropriate role, the new employee may be assigned resources according to the associated resource list using the method of FIG. 1. Similarly, an employee that is transferred to the position associated with the dotted box may be assigned resources according to role 405 by applying the method of FIG. 3. If any employee in role 405 requests a new resource, all employees in role 405 may receive the resource, if approved.

An exemplary resource list associated with role 405 is illustrated at the bottom of FIG. 4. the resource list comprises four fields, a resource description, a resource owner, an electronic communications address for requesting the resource, and a specification of a subset of employee identification data that is required for release of the resource. The resource list may comprise any number of entries 405a, 405b, 405c with these fields. The entries correspond to all of the various resources to which the employee of that role is entitled.

FIG. 5 illustrates an approach for associating resource lists with employees and for providing a plurality of selectable employees that may be used to determine appropriate employee resources. In an approach such as that of FIG. 5, it is contemplated that each and every employee in a company will be associated with a resource list. For example, each employee 501-511 may be associated with a resource list. When a new employee 511 enters the company, an appropriate resource list may be determined for that employee by assessing which of the other employees perform a function that is most similar to the intended function of the new employee. In the illustrated example, it is determined that employee 509 performs a substantially similar function to that intended for employee 511, and therefore a copy of employee 509's resource list can be made and assigned to new employee 511.

Similarly, if an employee is transferred to a new function, a different employee whose current function is now most similar to the transferred employee's new function may be selected, and the transferred employee may be assigned the same resources thereof. Any employee that wishes to modify their set of resources may do so according to the method of FIG. 2. An updated resource list is thus kept for each employee, allowing any new or transferred employee to immediately be assigned appropriate resources for their new position by selecting an appropriate most similar existing employee.

FIG. 6 illustrates an approach for associating resource lists with managers and for providing a plurality of selectable managers that may be used to determine appropriate employee resources. In an embodiment such as FIG. 6, the same resources are assigned to all employees under a particular manager. Thus, employees 602-603, and manager 604 may be assigned resources according to a resource list associated with manager 601. Manager 605 and employees 606-607 may be assigned resources according to a resource list associated with manager 604. Employees 608-611 may be assigned resources according to a resource list associated with manager 605.

A new employee 608 may be assigned a resource list by selected, e.g., from a drop-down menu of all managers in a company, the manager 605 that the new employee 608 will work under. A resource list such as that provided at the bottom of the figure may be associated with manager 605, and may provide entries 605a, 605b, 605c, for each and every resource that employees 608-611 may need. Similarly, an employee who is transferred to a position under manager 605 may be assigned resources from a resource list associated with manager 605. If any employee requests a new resource, the resource list associated with 605 may be updated according to the method of FIG. 2, and all employees 608-611 may receive the requested resource, if approved.

FIG. 7 illustrates an approach for associating resource lists with workstation locations and for providing a plurality of selectable workstation locations that may be used to determine appropriate employee resources. An approach such as that illustrated in FIG. 7 should be readily understood to one who studies FIGS. 4-6 and corresponding description. Here, resource lists may be associated with workstation locations. Resource lists may be associated at any grouping level. For example, if resource lists are available for each area 705-707, but not for individual workstations 708-711, then a new or transferred employee assigned to workstation 708 may be assigned resources according to a resource list associated with area 705. Alternatively, if workstation 708 has a resource list specifically associated with it, then a new or transferred employee assigned to location 708 can be given resources according to that specific resource list. Such an exemplary list is illustrated at the bottom of the figure, comprising any number of entries such as 708a, 708b, and 708c.

A resource list may be associated with an entire company headquarters 701, with whole buildings 702-704, as well as with areas 705-707 in a building 704 and individual workstations 708-711. In one embodiment, resource lists at a more specific location such as 711 may "inherit" any items on a resource list associated with a more general location such as area 705, as well as building 704 and headquarters 701. In this way, some uniformity in resources given to employees may be achieved on a location-oriented basis, while specific tailoring of resources is also an option.

Note that workstation location may also be included in employee identification data, for example as in entry 708a. Including workstation location in employee identification data is considered a useful embodiment because it allows resource owners to deliver resources directly to the employee's location. Employee identification number is also a useful item to include as it may be used to configure a variety of the resources assigned to an employee.

Figure 8:
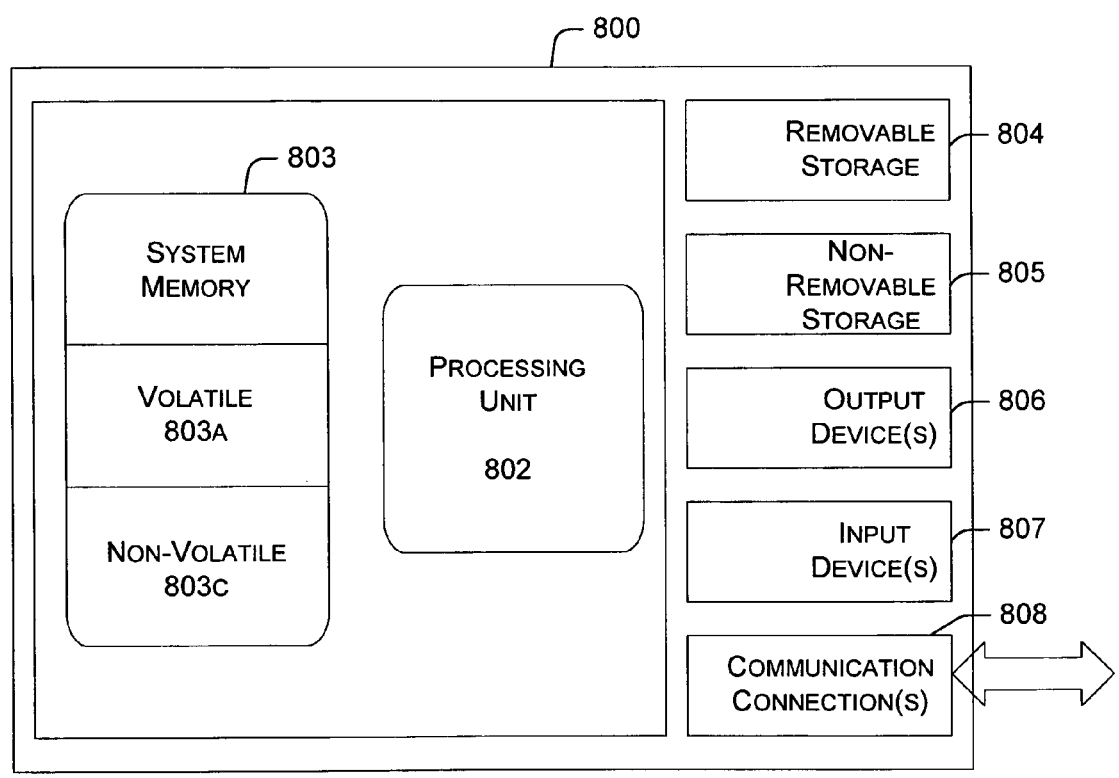
FIG. 8 illustrates an exemplary computing device that may be used in connection with various embodiments of the invention and which may comprise a variety of software and hardware subsystems that implement the methods illustrated in FIGS. 1-3.

FIG. 8 illustrates an exemplary computing device that may be used in connection with various embodiments of the invention and which may comprise a variety of software and hardware subsystems that implement the methods illustrated in FIGS. 1-3. With reference to FIG. 8, an exemplary computing device 800 suitable for use in connection with the systems and methods of the invention is broadly described. In its most basic configuration, device 800 typically includes a processing unit 802 and memory 803. Depending on the exact configuration and type of computing device, memory 803 may be volatile 803A (such as RAM), non-volatile 803B (such as ROM, flash memory, etc.) or some combination of the two. Additionally, device 800 may also have mass storage (removable 804 and/or non-removable 805) such as magnetic or optical disks or tape. Similarly, device 800 may also have input devices 807 such as a keyboard and mouse, and/or output devices 806 such as a display that presents a GUI as a graphical aid accessing the functions of the computing device 800. Other aspects of device 800 may include communication connections 808 to other devices, computers, networks, servers, etc. using either wired or wireless media. All these devices are well known in the art and need not be discussed at length here.

Figure 9:
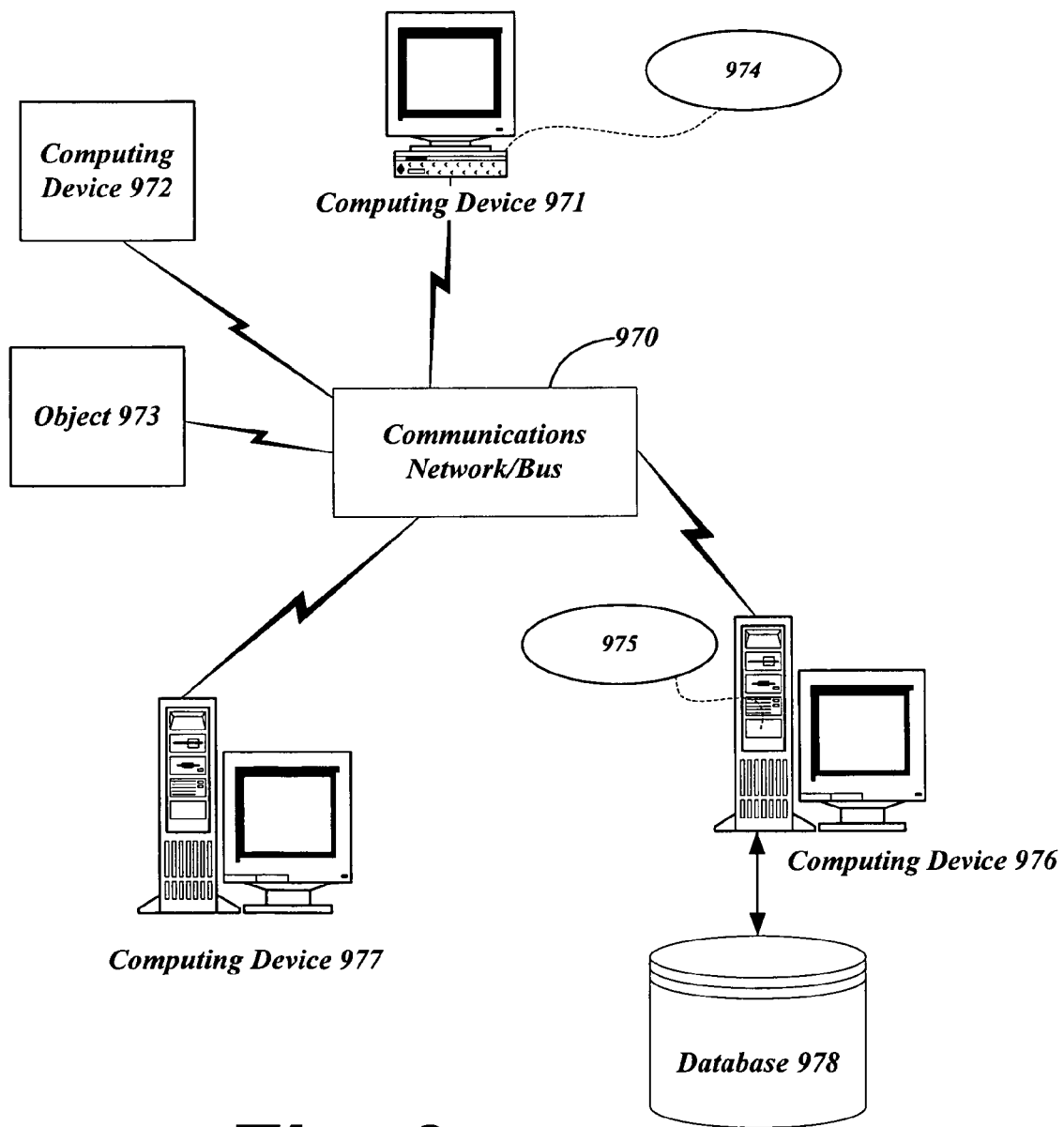
FIG. 9 illustrates an exemplary network environment that may be used in connection with various embodiments of the invention and which may comprise a variety of software and hardware subsystems that implement the methods illustrated in FIGS. 1-3.

FIG. 9 illustrates an exemplary network environment that may be used in connection with various embodiments of the invention and which may comprise a variety of software and hardware subsystems that implement the methods illustrated in FIGS. 1-3. FIG. 9 provides a schematic diagram of an exemplary networked or distributed computing environment. The environment comprises computing devices 971, 972, 976, and 977 as well as objects 973, 974, and 975, and database 978. Each of these entities 971, 972, 973, 974, 975, 976, 977 and 978 may comprise or make use of programs, methods, data stores, programmable logic, etc. The entities 971, 972, 973, 974, 975, 976, 977 and 978 may span portions of the same or different devices such as PDAs, audio/video devices, MP3 players, personal computers, etc. Each entity 971, 972, 973, 974, 975, 976, 977 and 978 can communicate with another entity 971, 972, 973, 974, 975, 976, 977 and 978 by way of the communications network 970. In this regard, any entity may be responsible for the maintenance and updating of a database 978 or other storage element.

This network 970 may itself comprise other computing entities that provide services to the system of FIG. 9, and may itself represent multiple interconnected networks. In accordance with an aspect of the invention, each entity 971, 972, 973, 974, 975, 976, 977 and 978 may contain discrete functional program modules that might make use of an API, or other object, software, firmware and/or hardware, to request services of one or more of the other entities 971, 972, 973, 974, 975, 976, 977 and 978.

It can also be appreciated that an object, such as 975, may be hosted on another computing device 976. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself In a client/server architecture, particularly a networked system, a client is usually a computer that accesses shared network resources provided by another computer, e.g., a server. In the example of FIG. 9, any entity 971, 972, 973, 974, 975, 976, 977 and 978 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, Hyper-Text Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 8 and FIG. 9, the systems and methods provided herein cannot be construed as limited in any way to a particular computing architecture. Instead, the present invention should not be limited to any single embodiment, but rather should be construed in breadth and scope in accordance with the appended claims.

What is claimed is:

1. A method for employee resource delivery, comprising:
receiving an existing employee request for a new resource;
identifying employee identification data associated with said existing employee, wherein the employee identification data includes an individual workstation location;
identifying a specification of a subset of employee identification data that is required for release of the resource;
identifying an electronic communications address for requesting the resource;
sending a resource request to said electronic communications address, said resource request comprising new employee identification data according to said specification of a subset of employee identification data;
receiving an approval to deliver the requested resource to the existing employee from a resource owner;
automatically updating a resource list with a new entry for the resource, wherein the new entry for the resource comprises a plurality of fields, the plurality of fields comprises a resource description field, a resource owner field, said electronic communications address for requesting the resource, and said specification of a subset of employee identification data that is required for release of the resource, and wherein a different resource list is kept for each of said existing employees and is automatically updated with the new entry for the resource.

2. The method of claim 1, wherein the resource list is associated with an employee role, and further comprising automatically sending at least one additional resource request to said electronic communications address for at least one additional existing employee associated with said role.

3. The method of claim 1, wherein the resource list is associated with a manager, and further comprising automatically sending at least one additional resource request to said electronic communications address for at least one additional existing employee associated with said manager.

4. The method of claim 1, wherein the resource list is associated with a workstation location, and further comprising automatically sending at least one additional resource request to said electronic communications address for at least one additional existing employee associated with a substantially similar workstation location.

5. The method of claim 1, wherein the employee identification data comprises an assigned employee identifier.

6. A system for employee resource delivery, comprising:
a processor;
the processor operatively coupled to a computer readable storage medium including computer executable instructions, the computer readable storage medium including:
instructions for receiving an existing employee request for a new resource;

instructions for identifying employee identification data associated with said existing employee, wherein the employee identification data includes an individual workstation location;

instructions for identifying a specification of a subset of employee identification data that is required for release of the resource;

instructions for identifying an electronic communications address for requesting the resource;

instructions for sending a resource request to said electronic communications address, said resource request comprising new employee identification data according to said specification of a subset of employee identification data;

instructions for receiving an approval to deliver the requested resource to the existing employee from a resource owner;

instructions for automatically updating a resource list with a new entry for the resource, wherein the new entry for the resource comprises a plurality of fields, the plurality of fields comprises a resource description field, a resource owner field, said electronic communications address for requesting the resource, and said specification of a subset of employee identification data that is required for release of the resource, and wherein a different resource list is kept for each of said existing employees and is automatically updated with the new entry for the resource.

7. The system of claim 6, wherein the resource list is associated with an employee role, and further comprising instructions for automatically sending at least one additional resource request to said electronic communications address for at least one additional existing employee associated with said role.

8. The system of claim 6, wherein the resource list is associated with a manager, and further comprising instructions for automatically sending at least one additional resource request to said electronic communications address for at least one additional existing employee associated with said manager.

9. The system of claim 6, wherein the resource list is associated with a workstation location, and further comprising instructions for automatically sending at least one additional resource request to said electronic communications address for at least one additional existing employee associated with a substantially similar workstation location.

10. The system of claim 6, wherein the employee identification data comprises an assigned employee identifier.

11. A computer readable storage medium bearing instructions for employee resource delivery, said instructions comprising:

instructions for receiving an existing employee request for a new resource;

instructions for identifying employee identification data associated with said existing employee, wherein the employee identification data includes an individual workstation location;

instructions for identifying a specification of a subset of employee identification data that is required for release of the resource;

instructions for identifying an electronic communications address for requesting the resource;

instructions for sending a resource request to said electronic communications address, said resource request comprising new employee identification data according to said specification of a subset of employee identification data;

instructions for receiving an approval to deliver the requested resource to the existing employee from a resource owner;

instructions for automatically updating a resource list with a new entry for the resource, wherein the new entry for the resource comprises a plurality of fields, the plurality of fields comprises a resource description field, a resource owner field, said electronic communications address for requesting the resource, and said specification of a subset of employee identification data that is required for release of the resource, and wherein a different resource list is kept for each of said existing employees and is automatically updated with the new entry for the resource.

12. The computer readable storage medium of claim 11, wherein the resource list is associated with an employee role, and further comprising instructions for automatically sending at least one additional resource request to said electronic communications address for at least one additional existing employee associated with said role.

13. The computer readable storage medium of claim 11, wherein the resource list is associated with a manager, and further comprising instructions for automatically sending at least one additional resource request to said electronic communications address for at least one additional existing employee associated with said manager.

14. The computer readable storage medium of claim 11, wherein the resource list is associated with a workstation location, and further comprising instructions for automatically sending at least one additional resource request to said electronic communications address for at least one additional existing employee associated with a substantially similar workstation location.

15. The computer readable storage medium of claim 11, wherein the employee identification data comprises an assigned employee identifier.

* * * * *